UNITED STATES PATENT OFFICE.

WILLIAM MARR, OF NEW YORK, N. Y.

IMPROVEMENT IN THE MANUFACTURE AND APPLICATION OF BISULPHITE OF LIME.

Specification forming part of Letters Patent No. 70,588, dated November 5, 1867.

*To all whom it may concern:*

Be it known that I, WILLIAM MARR, of the city, county, and State of New York, have invented a new and useful Improvement in the Manufacture of Bisulphite of Lime; and I do hereby declare that the following is a full, clear, and exact description thereof, which will enable others skilled in the art to make and use the same.

This invention relates to the manufacture and use of an improved article for the prevention of fermentation in beer, juices, sirups, and other liquids, and for the prevention of decomposition and decay of meats and other substances, whether of an animal or vegetable nature; and the invention consists in the manufacture of a bisulphite of lime by saturating the carbonate of lime (or common chalk) with distilled sulphurous-acid gas. The distilled gas combines chemically with the lime, forming thereby a bisulphite or acid sulphite adapted to the various purposes to which I apply it. After distillation, and before combining it with the carbonate, the gas is passed through water, or washed, to free it from its impurities, when the two are combined, forming a saturated solution in the form of a liquid convenient and ready for use. In applying it to the various purposes for which I intend it, the quantity used and the specific gravity of the article would have to be varied.

It will be understood that by the process of distillation, as connected with this article, a highly-concentrated bisulphite of lime is produced, which adapts it to many purposes to which articles of this nature have not hitherto been applied.

The particular object which I have in view is its application for arresting fermentation in liquors or juices in the processes of brewing and in manufacturing sugar, and also for arresting decomposition in animal as well as vegetable products, as meats and fruits.

As a disinfectant, to be used in carrying out sanitary regulations, either public or private, it is found invaluable, and as a medium for arresting the fermentation of the blood in zymotic diseases, especially in cases of yellow fever and cholera, it will be found far superior to any of the acids hitherto used for the purpose of medicine.

In the process of brewing, the application may be made in various ways or at different stages, and in the preservation of salted meats the article may be mixed either with the salt or brine.

Meats thus prepared may be transported to warm climates with perfect safety, and the juice of the cane and sorghum-juice, both North and South, can be preserved from fermentation for an indefinite period.

Having thus described my invention, what I claim as new, and desire to secure by Letters Patent, is—

1. The new article of manufacture, liquid bisulphite of lime, prepared substantially as herein described.

2. The improved mode of arresting fermentation in beer, ale, and other fermented liquors by the the application of liquid bisulphite of lime, substantially as herein described.

3. The application of liquid bisulphite of lime for preventing fermentation in saccharine and other fermentable liquids.

4. The application of liquid bisulphite of lime for preserving meat and fish, substantially as described.

The above specification of my invention signed by me this 19th day of August, 1867.

WILLIAM MARR.

Witnesses:
WM. F. MCNAMARA,
ALEX. F. ROBERTS.